(12) United States Patent
Clerckx et al.

(10) Patent No.: US 8,477,663 B2
(45) Date of Patent: Jul. 2, 2013

(54) MULTIPLE INPUT MULTIPLE OUTPUT COMMUNICATION SYSTEM AND COMMUNICATION METHOD OF CONFIGURING CODEBOOK

(75) Inventors: Bruno Clerckx, Seoul (KR); Ki Il Kim, Yongin-si (KR); Jun Il Choi, Seoul (KR); David J. Love, West Lafayette, IN (US); Taejoon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 285 days.

(21) Appl. No.: 12/791,841

(22) Filed: Jun. 1, 2010

(65) Prior Publication Data

US 2011/0292926 A1    Dec. 1, 2011

(51) Int. Cl.
*H04J 1/16*    (2006.01)
*H04L 12/56*    (2006.01)

(52) U.S. Cl.
USPC ............ 370/278; 370/252; 370/329; 370/430

(58) Field of Classification Search
USPC ................... 370/252, 278, 329, 430
See application file for complete search history.

(56) References Cited

U.S. PATENT DOCUMENTS

| | | | |
|---|---|---|---|
| 2008/0219369 A1* | 9/2008 | Wu et al. | 375/260 |
| 2011/0249637 A1* | 10/2011 | Hammarwall et al. | 370/329 |
| 2011/0268207 A1* | 11/2011 | Choi et al. | 375/267 |
| 2012/0069919 A1* | 3/2012 | Clerckx et al. | 375/259 |

* cited by examiner

*Primary Examiner* — John Pezzlo
(74) *Attorney, Agent, or Firm* — NSIP Law

(57) ABSTRACT

A multiple input multiple output (MIMO) communication system and communication method of configuring a codebook are provided. A channel may be formed between a transmitter and a receiver, and a cross-polarization discrimination value (XPD) may be detected. The XPD may vary based on a location of the transmitter and the receiver, a mobility thereof, or a peripheral environment, among other factors. The codebook may be configured based on the XPD.

22 Claims, 7 Drawing Sheets

MULTIPLE INPUT MULTIPLE OUTPUT COMMUNICATION SYSTEM AND COMMUNICATION METHOD OF CONFIGURING CODEBOOK

BACKGROUND

1. Field

The following description relates to a multiple input multiple output (MIMO) communication system, and more specifically, to a MIMO communication system that may use a codebook.

2. Description of Related Art

In a MIMO communication system, a base station and terminals may use a codebook to facilitate secure and efficient management of a channel environment. A particular space may be quantized into a plurality of codewords. This plurality of codewords may be stored in the base station and the terminals.

As one example, in a downlink communication, a terminal may select a preferred codeword from codewords included in a codebook according to a channel formed between the base station and the terminal. The base station may receive information associated with the selected preferred codeword; the base station uses the codebook to detect the channel. The selected preferred codeword may be used by the base station for performing precoding or for transmitting data via multiple antennas.

In a MIMO communication system that uses a fixed codebook, performance of the MIMO communication system may be limited due to a relatively large quantization error of the fixed codebook.

SUMMARY

In one general aspect, a communication method for a multiple input multiple output (MIMO) communication system includes detecting a cross-polarization discrimination value (XPD) of a channel formed between a receiver and a transmitter, configuring a new codebook corresponding to the XPD according to a predetermined metric function, and storing the new codebook in a memory for a communication between the receiver and the transmitter.

The new codebook may be configured according to an upper bound of the predetermined metric function based upon the XPD.

The configuring may include calculating an upper bound of the predetermined metric function based upon the XPD, a pre-defined first codebook, and a pre-defined second codebook, and configuring the new codebook according to the upper bound of the predetermined metric function.

The calculating may include calculating the upper bound of the predetermined metric function according to a weighted sum of a distortion of the pre-defined first codebook and a distortion of the pre-defined second codebook.

The first pre-defined codebook may correspond to a first channel, the first channel having 1 as an inverse number of the XPD, and the first pre-defined codebook may be provided according to a Grassmannian line packing scheme. The second pre-defined codebook may correspond to a second channel, the second channel having zero as the inverse number of the XPD, and the second pre-defined codebook may be provided in a block diagonal form.

The new codebook is configured according to the predetermined metric function, with respect to distortions of codewords included in the new codebook.

The predetermined metric function may be associated with a distortion of an average signal-to-noise ratio (SNR), and the codewords included in the new codebook may quantize a particular space, resulting in a distortion of the average SNR.

The new codebook may be used by the receiver and the transmitter to share channel information associated with the channel.

A computer-readable medium may store a program to implement the method.

In another general aspect, a communication method for a MIMO communication system includes detecting an XPD of a channel formed between a receiver and a transmitter, extracting $N_w$ first codewords from a pre-defined first codebook, and extracting $N_d$ second codewords from a pre-defined second codebook, based on the XPD, and configuring a new codebook based upon the $N_w$ first codewords and the $N_d$ second codewords. Here, $N_w$ denotes an integer and $N_d$ denotes an even number.

The method may further include calculating an upper bound of a metric function associated with distortions of codewords included in the new codebook, based upon the XPD, and determining a value of $N_w$ and a value of $N_d$ based upon the upper bound of the metric function.

The calculating may include calculating the upper bound of the metric function according to a random vector quantization.

The calculating may include calculating the upper bound of the metric function according to a weighted sum of a distortion of the pre-defined first codebook and a distortion of the pre-defined second codebook.

The determining may include determining the value of $N_w$ and the value of $N_d$ so that the upper bound of the metric function is substantially minimized.

The configuring may include configuring the new codebook according to a minimum distance between codewords included in the new codebook.

The configuring may include configuring the new codebook by processing at least one of the $N_w$ first codewords and the $N_d$ second codewords with respect to a block diagonal unitary matrix.

In still another general aspect, a communication method for a MIMO communication system includes detecting an XPD of a channel formed between a receiver and a transmitter, calculating an upper bound of a metric function associated with distortions of codewords included in a new codebook, based upon the XPD, determining a value of $N_w$ associated with a first codebook and a value of $N_d$ associated with a second codebook, with respect to the upper bound of the metric function, wherein $N_w$ denotes an integer and $N_d$ denotes an even number, and selecting one of the first codebook and the second codebook as the new codebook, according to the value of $N_w$ and the value of $N_d$.

The selecting may include selecting the new codebook according to a comparison of the value of $N_w$ and the value of $N_d$ with a predetermined value.

The first codebook may correspond to a first channel, the first channel having 1 as an inverse number of the XPD, and the first codebook may be provided according to a Grassmannian line packing scheme. The second codebook may correspond to a channel, the second channel having zero as the inverse number of the XPD, and the second codebook may be provided in a block diagonal form.

In yet another general aspect, a communication apparatus for a MIMO communication system includes a recognition unit configured to detect an XPD of a channel formed between a receiver and a transmitter, a configuring unit configured to configure a new codebook corresponding to the XPD according to a predetermined metric function, and a memory configured to store the new codebook for a communication between the receiver and the transmitter.

The configuring unit may include an upper bound calculator configured to calculate an upper bound of the predetermined metric function based upon the XPD, a pre-defined first codebook, and a pre-defined second codebook.

The configuring unit may include an extractor configured to extract $N_w$ first codewords from a pre-defined first codebook, and extract $N_d$ second codewords from a pre-defined second codebook, based on the XPD. Here, $N_w$ denotes an integer and $N_d$ denotes an even number.

The configuring unit may include a decision unit configured to determine a value of $N_w$ and a value of $N_d$ based upon the upper bound of the predetermined metric function associated with distortions of codewords included in the new codebook.

The configuring unit may include a selector configured to select one of the pre-defined first codebook and the pre-defined second codebook as the new codebook, according to the value of $N_w$ and the value of $N_d$.

Accordingly, it may be possible to obtain a codebook with a relatively small quantization error by configuring a new codebook according to an XPD. Further, it may be possible to improve effectiveness in obtaining a new codebook corresponding to an XPD, by using a metric function or an upper bound of the metric function. Still further, it may be possible to obtain a new codebook corresponding to an XPD with a relatively small amount of calculations.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

The term "communication apparatus" used herein may include various types of devices to transmit and receive data in a communication system; examples of a communication apparatus include a base station, a relay, a terminal, and the like. The term "base station" used herein may include a general base station of a cellular communication system, and a small base station; examples of a base station include a femto base station, a pico base station, and the like. The base station may include devices used to serve various types of receivers, such as terminals and relays. The term "terminal" used herein may include a mobile device, as well as various types of devices to receive a data signal from the base station or the relay. Examples of a mobile device include a cellular phone, a notebook, a smart phone, and the like. The relay may include a mobile relay, a fixed relay, and the like.

Figure 1:
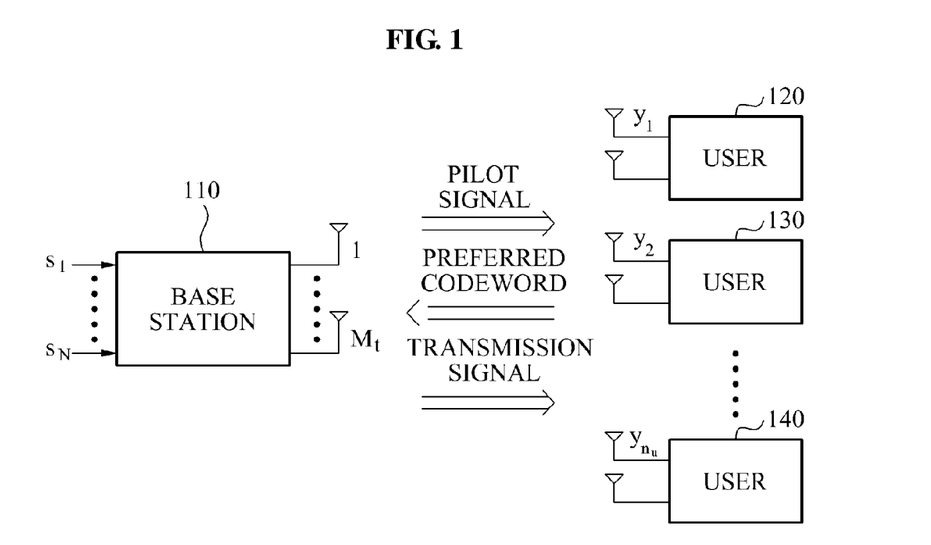
FIG. 1 is a diagram illustrating an example of a multi-user multiple input multiple output (MIMO) communication system.

FIG. 1 illustrates a multi-user multiple input multiple output (MIMO) communication system.

Referring to FIG. 1, an example of a closed-loop MIMO communication system includes a base station 110 and users 120, 130, and 140. Although FIG. 1 illustrates a multi-user MIMO communication system, the example may be similarly applied to various types of communication systems, for example, a single-user MIMO communication system, a multi-cell MIMO communication system, and the like. The term "closed-loop" indicates that feedback information is provided to the transmitter. For example, in a downlink of the closed-loop MIMO communication system, the users 120, 130, and 140 may each provide feedback information to the base station 110. The base station 110 may perform precoding based on the feedback information and may generate a transmission signal.

One or more antennas may be installed in the base station 110. One or more antennas may be installed in each of the users 120, 130, and 140. A channel may be formed between the base station and each of the users 120, 130, and 140. Signals may be transmitted and received via each formed channel.

The base station 110 may transmit pilot signals to each of the users 120, 130, and 140, via respective downlink channels. The pilot signals may be provided to the base station 110 and the users 120, 130, and 140.

Each of the users 120, 130, and 140 may use a pilot signal to estimate a channel that is formed between the base station 110 and each of the users 120, 130, and 140. Each of the users 120, 130, and 140 may select, as a preferred codeword, at least one codeword from a plurality of codewords included in a pre-stored codebook. The preferred codeword may be referred to as a "preferred vector" or a "preferred matrix".

The base station 110 may transmit one or more data streams to each of the users 120, 130, and 140. For example, the base station 110 may adopt a spatial division multiplex access (SDMA) scheme. The base station 110 may generate a precoding matrix based on the codewords included in the codebook, particularly, from the preferred codeword, and may generate a transmission signal using the generated precoding matrix.

Each of the users 120, 130, and 140 may provide, to the base station 110, information associated with a corresponding channel as feedback information, so that the base station 110 may generate the transmission signal. For example, each of the users 120, 130, and 140 may estimate the corresponding channel, and determine an index of a preferred codeword. Accordingly, each of the users 120, 130, and 140 estimate direction information, channel quality information associated with the corresponding channel, and a preferred transmission rank. The base station 110 may determine a precoding matrix based on the feedback information. A codebook may be provided so that each of the users 120, 130, and 140 may determine the index of the preferred codeword, or so that the base station 110 may interpret the feedback information to determine the precoding matrix. The base station 110 and the users 120, 130, and 140 may use the same codebook. In a limited feedback-based MIMO communication system, an amount of feedback information generated by each of the users 120, 130, and 140 may be limited. Therefore, a size of the codebook, for example, the number of codewords included in the codebook, may also be limited.

Figure 2:
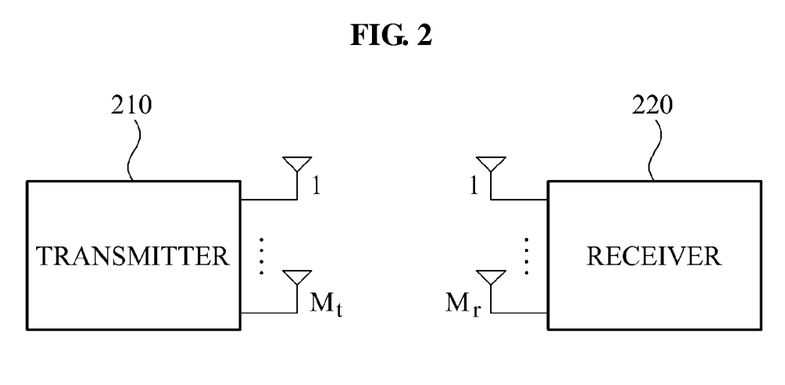
FIG. 2 is a diagram illustrating an example of a single-user MIMO communication system.

FIG. 2 illustrates a single-user MIMO communication system.

Referring to FIG. 2, an example of a single-user MIMO communication system includes a single transmitter 210 and a single receiver 220. Although FIG. 2 illustrates a single-user MIMO communication system, the example may be similarly applied to various types of communication systems, for example, a multi-user MIMO communication system, a multi-cell MIMO communication system, and the like. For ease of explanation, descriptions will be made generally based on the single-user MIMO communication system.

The transmitter 210 includes $M_t$ transmit antennas, and the receiver 220 includes $M_r$ receive antennas. Channels may be formed between the $M_t$ transmit antennas and the $M_r$ receive antennas. Signals may be transmitted and received via the channels. A channel may have multi-polarizations, for example, dual polarizations according to a polarization of each of the $M_t$ transmit antennas and each of the $M_r$ receive antennas. A dual polarized channel $H_\chi$ may be modeled as provided by the following Equation 1:

$$H_\chi = X \odot H_w \qquad (1)$$
$$X = \begin{bmatrix} 1 & \sqrt{\chi} \\ \sqrt{\chi} & 1 \end{bmatrix} \otimes \text{ones}\left(\frac{M_r}{2}, \frac{M_t}{2}\right).$$

In Equation 1, $H_w$ denotes an independently and identically distributed Gaussian channel matrix with a zero-mean and a unit-variance, and $\chi$ denotes an inverse number of a cross-polarization discrimination value (XPD) where $0 \leq \chi \leq 1$. The XPD denotes a physical capability of an antenna that may discriminate different polarizations. $\odot$ denotes a Hadamard product, $\otimes$ denotes a Kronecker product, and ones (a, b) denotes an a×b matrix. Every element of the ones (a, b) matrix is "1".

According to the above Equation 1, the channel $H_\chi$ may be expressed using the XPD or using $\chi$ and $H_w$. The receiver 220 may estimate the channel $H_\chi$ using a pilot signal to detect $\chi$ or the XPD, and the receiver 220 may quantize $\chi$ or the XPD to feed back $\chi$ or the XPD to the transmitter 210. Accordingly, the transmitter 210 may also detect $\chi$ or the XPD. For example, where $\chi$ is quantized at 1/N intervals, the transmitter 210 may receive, from the receiver 220, $\chi$ or [log$_2$ N] bits of index information to detect $\chi$ or the XPD.

Generally, as a distance between the transmitter 210 and the receiver 220 decreases, $\chi$ approaches "0". As the distance between the transmitter 210 and the receiver 220 increases, $\chi$ approaches "1". In particular, if two polarizations of a transmission signal are orthogonal to each other, $\chi$ is zero. In this example, codewords included in a codebook may be provided in a form of a block diagram matrix.

A received signal at the receiver 220 may be expressed by the following Equation 2:

$$y = \sqrt{\rho} z^* H_\chi f s + z^* n \qquad (2).$$

In Equation 2, $z \in C^{M_r \times 1}$ denotes a unit-norm receive combining vector, $f \in C^{M_t \times 1}$ denotes a unit-norm transmit beamforming vector, n denotes an $M_r \times 1$ noise vector, s denotes a transmission symbol having the energy of 1, and $\rho$ denotes a signal-to-noise ratio (SNR). The elements of the $M_r \times 1$ noise vector are provided according to a standard normalization distribution Block Diagonal Codebook If two polarizations are orthogonal to each other, $\chi$ may be modeled as zero and a channel matrix $H_\chi$ may be expressed by the following Equation 3:

$$H_{\chi=0} \equiv H_D = \begin{bmatrix} H_{11} & 0 \\ 0 & H_{22} \end{bmatrix}. \qquad (3)$$

Accordingly, if $\chi$ is equal to zero, the channel matrix $H_\chi$ may be provided in the form of a block diagonal matrix.

Block diagonal matrices that have codewords included in a block diagonal codebook may include a plurality of blocks corresponding to a number of polarizations. For example, if one polarization direction is vertical and another polarization direction is horizontal, each of the block diagonal matrices may include four blocks. The four blocks may include two diagonal blocks and two remaining blocks.

A plurality of matrices may be allocated to each of the diagonal blocks, and a zero matrix may be allocated to the remaining blocks. In particular, each of the diagonal blocks may include a discrete Fourier transform (DFT) matrix included in a DFT codebook, or a rotation DFT matrix included in a rotation DFT codebook.

It is not necessary for block diagonal matrix to be a square matrix. For example, a size of the block diagonal matrix may be determined based on a transmission rank associated with a number of data streams to be transmitted. Accordingly, the transmission rank may not exceed the number of transmit antennas. As an example, if the number of transmit antennas is four a maximum transmission rank may be limited to four. If the transmission rank is three, the block diagonal matrix may be a 4×3 matrix.

In a dual polarized channel, a block diagonal matrix $U^{(i)}$ may be expressed by the following Equation 4:

$$U^{(i)} = \begin{bmatrix} A & 0 \\ 0 & B \end{bmatrix}. \qquad (4)$$

Referring to the above Equation 4, the block diagonal matrix $U^{(i)}$ in the dual polarized channel may include four blocks. For a triple polarized channel, $U^{(i)}$ may include nine blocks. $U^{(i)}$ may be an $M_r \times M$ matrix, where M denotes a transmission rank.

For rotated block diagonal matrices, $U^{(i)}$ is rotated by a +/−45 degrees rotation matrix. An example of a rotation matrix is $$U_{rot} = \begin{bmatrix} 1 & 0 & -1 & 0 \\ 0 & 1 & 0 & -1 \\ 1 & 0 & 1 & 0 \\ 0 & 1 & 0 & 1 \end{bmatrix}.$$

A rotated block diagonal matrix may be denoted as $U_{rot} U^{(i)}$. Referring again to the above Equation 4, A and B may be allocated to diagonal blocks of $U^{(i)}$. A and B may be DFT matrices included in the DFT codebook, or may be rotation DFT matrices included in the rotation DFT codebook.

The DFT codebook may be expressed by the following Equation 5. The DFT codebook may include $2^B$ DFT precoding matrices:

$$\gamma = \{U^{(0)}, U^{(1)}, \ldots, U^{(2^B-1)}\} \quad (5)$$
$$U^{(b)} = [u_0^{(b)} \ldots u_{M-1}^{(b)}]$$
$$u_m^{(b)} = \frac{1}{\sqrt{M}}[u_{0m}^{(b)} \ldots u_{(M-1)m}^{(b)}]^T$$
$$u_{nm}^{(b)} = \exp\left\{j\frac{2\pi n}{M}\left(m + \frac{b}{2^B}\right)\right\}.$$

In Equation 5, $\gamma$ denotes the DFT codebook, $U^{(b)}$ denotes the $b^{th}$ matrix to be stored in the DFT codebook, $u_{m-1}^{(b)}$ denotes that $m^{th}$ column vector in $U^{(b)}$, B denotes a number of bits of feedback information to be fed back by the receiver 220, and M denotes a number of transmit antennas.

As an example, if the number of transmit antennas is two, a DFT matrix may be any one of matrices as expressed by the following Equation 6:

$$\begin{bmatrix} 1 & 1 \\ j & -j \end{bmatrix}, \begin{bmatrix} 1 & 1 \\ 1 & -1 \end{bmatrix}. \quad (6)$$

Among four transmit antennas, if a polarization of two transmit antennas is orthogonal to a polarization of two remaining transmit antennas, the transmission rank is four. If $\chi$ is equal to zero, the block diagonal matrix may be generated by combining the two matrices as shown in the above Equation 6. Examples of the block diagonal matrix are provided by, but not limited to, the following Equation 7:

$$\begin{bmatrix} 1 & 1 & 0 & 0 \\ j & -j & 0 & 0 \\ 0 & 0 & 1 & 1 \\ 0 & 0 & j & -j \end{bmatrix}, \begin{bmatrix} 1 & 1 & 0 & 0 \\ 1 & -1 & 0 & 0 \\ 0 & 0 & 1 & 1 \\ 0 & 0 & 1 & -1 \end{bmatrix}. \quad (7)$$

Although the transmission rank of the block diagonal matrices of the above Equation 7 is four, the transmission rank may be varied. As an example, if the transmission rank is two, examples of block diagonal matrices are provided by, but not limited to, the following Equation 8:

$$\begin{bmatrix} 1 & 1 \\ 1 & -1 \\ 0 & 0 \\ 0 & 0 \end{bmatrix}, \begin{bmatrix} 0 & 0 \\ 0 & 0 \\ 1 & 1 \\ 1 & -1 \end{bmatrix}, \begin{bmatrix} 1 & 0 \\ 1 & 0 \\ 0 & 1 \\ 0 & 1 \end{bmatrix}, \begin{bmatrix} 1 & 0 \\ 1 & 0 \\ 0 & 1 \\ 0 & -1 \end{bmatrix}, \begin{bmatrix} 1 & 0 \\ -1 & 0 \\ 0 & 1 \\ 0 & 1 \end{bmatrix}, \begin{bmatrix} 1 & 0 \\ -1 & 0 \\ 0 & 1 \\ 0 & -1 \end{bmatrix}. \quad (8)$$

The above six matrices of the above Equation 8 are in a form of the block diagonal matrices.

The rotation DFT matrix may be allocated to the diagonal block. The rotation DFT codebook including a plurality of rotation DFT matrices may be expressed by the following Equation 9:

$$E^{(i)} = \begin{bmatrix} e^{j\theta_0} & 0 & \ldots & 0 \\ 0 & e^{j\theta_1} & \ldots & 0 \\ \vdots & \vdots & \ddots & \vdots \\ 0 & 0 & \ldots & e^{j\theta_{M-1}} \end{bmatrix} DFT_M. \quad (9)$$

$\{E, E^2, \ldots E^{2^B}\}$ denotes a rotation DFT codebook that is a set of rotation DFT precoding matrices, and $DFT_M$ denotes the DFT matrix.

Codebook Adaptation Based on XPD or $\chi$

Various parameters may be used as a performance metric in a limited feedback-based MIMO communication system. In particular, a performance metric may be implemented as maximize the average of instant SNR. It is noted that various metric functions may be implemented. However, the performance metric to maximize the average of instant SNR may be expressed as a metric function of equivalently minimizing the following Equation 10:

$$G(F_\chi) = E[\lambda_1(H_\chi^* H_\chi)] - E\left[\max_{f_\chi \in F_\chi} \|H_\chi f_\chi\|_2^2\right]. \quad (10)$$

In Equation 10, a metric function $G(F_x)$ corresponding to $\chi$ denotes an average SNR distortion occurring due to a quantization error of a codebook used in a MIMO communication system.

A new codebook corresponding to an XPD or $\chi$ may be provided by $F_\chi = \{f_{\chi,1}, f_{\chi,2}, \ldots, f_{\chi,N}\}$; the new codebook may be determined to minimize the metric function $G(F_x)$.

A first codebook with respect to a channel having an inverse number of the XPD of "1" may be expressed by $F_w$. A second codebook with respect to a channel having the inverse number of the XPD of zero may be expressed by $F_d$. The first codebook $F_w$ may be determined using a Grassmannian line packing scheme, implemented as a codebook used in a single-polarized channel. The Grassmannian line packing scheme may determine a codebook to maximize the lower bound of distances between codewords. The second codebook $F_d$ may be the aforementioned block diagonal codebook.

Generally, an upper bound of the metric function $G(F_x)$ may be used to determine the optimal new codebook. For example, the new codebook may be determined by minimizing the upper bound of the metric function $G(F_x)$. The upper bound of the metric function $G(F_x)$ may be expressed by the following Equation 11:

$$G(F_\chi) = E\left[\lambda_1(H_\chi^* H_\chi) - \max_{f_\chi \in F_\chi} \|H_\chi f_\chi\|_2^2\right] \leq \quad (11)$$

$$\sqrt{\chi} E\left[\lambda_1(H_w^* H_w) - \max_{f_w \in F_w} \|H_w f_w\|_2^2\right] +$$

$$(1 - \sqrt{\chi}) E\left[\lambda_1(H_d^* H_d) - \max_{f_d \in F_d} \|H_d f_d\|_2^2\right].$$

Referring to the above Equation 11, the upper bound of $G(F_\chi)$ may be determined based on $\chi$, the first codebook $F_W$, and the second codebook $F_d$. In Equation 11, Also in Equation 11, $$\sqrt{\chi} E\left[\lambda_1(H_w^* H_w) - \max_{f_w \in F_w} \|H_w f_w\|_2^2\right]$$

denotes a distortion of the first codebook. Further in Equation 11, $$(1 - \sqrt{\chi}) E\left[\lambda_1(H_d^* H_d) - \max_{f_d \in F_d} \|H_d f_d\|_2^2\right]$$

denotes a distortion of the second codebook. Accordingly, the upper bound of $G(F_\chi)$ shown in the above Equation 11 may be expressed as a weighted sum of the distortion of the first codebook and the distortion of the second codebook.

The new codebook may be configured based upon the metric function $G(F_\chi)$ or the upper bound of $G(F_\chi)$. In particular, the new codebook may be formed by combining codewords included in the first codebook and codewords included in the second codebook. The new codebook determined based on the codewords of the first codebook and the codewords of the second codebook may be expressed as $F_{\chi,con}$. $\tilde{F}_w$ denotes a set of $N_w$ codewords among the codewords of the first codebook $\tilde{F}_W$, and $\tilde{F}_d$ denotes a set of $N_d$ codewords among the codewords of the second codebook $\tilde{F}_d$. A size of the new codebook $F_{\chi,con}$ may be $N=2^B$, that is, a number of codewords may be $N_w + N_d$. Accordingly, the new codebook $F_{\chi,con}$ may be expressed by $F_{\chi,con} = \{\tilde{F}_w, \tilde{F}_d\}$. The new codebook $F_{\chi,con}$ may be provided by implementations other than $F_{\chi,con} = \{\tilde{F}_w, \tilde{F}_d\}$.

$N_w$ and $N_d$ may be determined based on $\chi$. For example, if $\chi=1$, $N=N_w$. If $\chi=0$, $N=N_d$. If $0<\chi<1$, $N_w$ and $N_d$ may be determined in order to minimize the upper bound of the metric function $G(F_\chi)$ shown in the above Equation 11.

The upper bound of the metric function $G(F_\chi)$ shown in the above Equation 11 may be expressed by the following Equation 12:

$$G(F_{\chi,con}) \leq \sqrt{\chi} E\left[\lambda_1(H_w^* H_w) - \max_{\tilde{f}_w \in \tilde{F}_w} \|H_w f_w\|_2^2\right] + \quad (12)$$

$$(1-\sqrt{\chi}) E\left[\lambda_1(H_d^* H_d) - \max_{\tilde{f}_d \in \tilde{F}_d} \|H_d f_d\|_2^2\right] \leq$$

$$\sqrt{\chi} E[\lambda_{w,1}] E\left[1 - \max_{\tilde{f}_w \in \tilde{F}_w} |v_{w,1}^* \tilde{f}_w|^2\right] +$$

$$(1-\sqrt{\chi}) E[\lambda_{d,1}] E\left[1 - \max_{\tilde{f}_s \in \tilde{F}_s} |v_{s,1}^* \tilde{f}_s|^2\right].$$

In Equation 12, $\lambda_1(H_w^* H_w)$ denotes $\lambda_{w,1}$ as a dominant eigen value of $H_w^* H_w$, $\lambda_1(H_d^* H_d)$ denotes $\lambda_{d,1}$ as a dominant eigen value of $H_d^* H_d$, $v_{w,1}$ denotes a dominant eigen vector of $H_w^* H_w$, and $v_{s,1}$ denotes a dominant eigen vector of $H_s^* H_s$ denotes an $M_r/2 \times M_t/2$ single-polarized channel matrix, and elements of the single-polarized channel matrix are independent identically distributed according to a standard normalization distribution with a zero-mean and a unit-variance.

$\tilde{F}_d$ may be expressed by the following Equation 13:

$$\tilde{F}_d = \{\tilde{F}_{du}, \tilde{F}_{dl}\} = \{\tilde{f}_{du,1}, \ldots \tilde{f}_{du,N_d/2}, \tilde{f}_{dl,1}, \ldots \tilde{f}_{dl,N_d/2}\} \quad (13).$$

Referring to the above Equation 13, $\tilde{F}_d$ may include $N_d/2$ upper non-zero codewords $\tilde{f}_{du}$ and $N_d/2$ lower non-zero codewords $\tilde{f}_{dl}$. Here, $N_d$ denotes a positive even integer. $\tilde{f}_{du}$ and $\tilde{f}_{dl}$ may be generated according to the Grassmannian line packing scheme. For example, $\tilde{f}_{du}$ and $\tilde{f}_{dl}$ may be expressed using a codebook $\tilde{F}_S = \{\tilde{f}_{s,1}, \tilde{f}_{s,2}, \ldots \tilde{f}_{s,N_d/2}\}$ that is determined according to the Grassmannian line packing scheme, as provided by the following Equation 14:

$$\tilde{f}_{du,i} = \begin{bmatrix} \tilde{f}_{s,i} \\ 0_{\frac{M_t}{2} \times 1} \end{bmatrix}, \tilde{f}_{dl,i} = \begin{bmatrix} 0_{\frac{M_t}{2} \times 1} \\ \tilde{f}_{s,i} \end{bmatrix}. \quad (14)$$

As described above, the new codebook $F_{\chi,con}$ may vary according to $\chi$. In particular, since $N_w$ and $N_d$ may vary according to $\chi$, the optimal new codebook $F_{\chi,con}$ may be provided by determining an optimal combination among combinations of $N_w$ and $N_d$. The upper bound of the metric function shown in the above Equation 12 may be expressed using a random vector quantization and be expressed by the following Equation 15:

$$G(F_{\chi,con}) \leq \sqrt{\chi} E[\lambda_{w,1}] N_w^{-\frac{1}{M_t-1}} + (1-\sqrt{\chi}) E[\lambda_{d,1}] N_s^{-\frac{2}{M_t-2}}. \quad (15)$$

In Equation 15, and $N_s = |\tilde{F}_s|$, and $N_s = N_d/2$. Since $N = N_w + N_d$, and $N_d$ is an even number, an optimal combination of $N_w$ and $N_d$ may be determined by minimizing the upper bound of the metric function shown in the above Equation 15. The optimization may be expressed by the following Equation 16:

$$N_w = \underset{\tilde{N}_w}{\arg\min} \quad (16)$$

$$\left(\sqrt{\chi} E[\lambda_{w,1}] \tilde{N}_w^{-\frac{1}{M_t-1}} + (1-\sqrt{\chi}) E[\lambda_{d,1}](N-\tilde{N}_w)^{-\frac{2}{M_t-2}} 2^{\frac{2}{M_t-2}}\right)$$

s.t. $N = \tilde{N}_w + \tilde{N}_d$, $\tilde{N}_w \geq 0$, $\tilde{N}_d \geq 0$, and $\tilde{N}_d$ is even integer.

According to the above Equation 16, an optimal $\tilde{N}_w$ corresponding to $\chi$ may be determined. A criterion of optimal $\tilde{N}_w$ may be expressed by the following Equation 17:

$$\left(\frac{1-\sqrt{\chi} E[\lambda_{d,1}] M_t - 1}{\sqrt{\chi} E[\lambda_{w,1}] M_t - 2} 2^{\frac{M_t}{M_t-2}}\right)^{\frac{M_t-2}{M_t}} = \frac{N - \tilde{N}_w}{(\tilde{N}_w)^{\frac{M_t-2}{M_t-1}}}. \quad (17)$$

If a numerical grid search is performed with respect to the above Equation 16 and Equation 17, the optimal $\tilde{N}_w$ may be obtained as expressed by the following Equation 18:

$$\tilde{N}_w = \underset{\tilde{N}_w \in N_w}{\operatorname{argmin}} \left| \frac{N - \tilde{N}_w}{(\tilde{N}_w)^{\frac{M_t-2}{M_t-1}}} - \left( \frac{1-\sqrt{\chi}}{\sqrt{\chi}} \frac{E[\lambda_{d,1}]}{E[\lambda_{w,1}]} \frac{M_t-1}{M_t-2} 2^{\frac{M_t}{M_t-2}} \right)^{-\frac{M_t-2}{M_t}} \right|. \quad (18)$$

In Equation 18, $N_w = \{0, N/L, 2N/L, \ldots, (L-1)N/L, N\}$, and L denotes a number of quantization levels. With respect to the optimal $\tilde{N}_w$ determined according to the above Equation 18, the optimal combination of $N_w$ and $N_d$ may be expressed by the following Equation 19:

$$\begin{cases} N_w = \min\{\lfloor \tilde{N}_w \rfloor_2, N\} \\ N_d = N - N_w. \end{cases} \quad (19)$$

$\lfloor \bullet \rfloor_2$ denotes a flooring function nearest to an even number.

According to the optimal combination of $N_w$ and $N_d$, the new codebook $F_{\chi,con}$ corresponding to $\chi$ may be provided so that the upper bound of the metric function shown in the above Equation 12 may be minimized $\tilde{F}_w = \{\tilde{f}_{w,1}, \ldots \tilde{f}_{w,N_w}\}$ may be determined to maximize the lower bound of distances between codewords according to the Grassmannian line packing scheme. The minimal distance between the codewords may be expressed by the following Equation 20:

$$\sigma_w(\tilde{F}_w) = \min_{1 \le i \le j \le N_w} \sqrt{1 - |\tilde{f}_{w,i}^* \tilde{f}_{w,j}|^2}. \quad (20)$$

Similarly, $\tilde{F}_s\{=\tilde{f}_{s,1}, \ldots \tilde{f}_{s,N_s}\}$ may also be determined to maximize the lower bound of distances between the codewords according to the Grassmannian line packing scheme. The minimum distance may be expressed by the following Equation 21:

$$\sigma_s(\tilde{F}_s) = \min_{1 \le i \le j \le N_s} \sqrt{1 - |\tilde{f}_{s,i}^* \tilde{f}_{s,j}|^2}. \quad (21)$$

$\tilde{F}_d$ may include $N_d/2$ upper non-zero codewords $\tilde{f}_{du}$ and $N_d/2$ lower non-zero codewords $\tilde{f}_{dl}$. As described above, $\tilde{f}_{du}$ and $\tilde{f}_{dl}$ and may be expressed using $\tilde{F}_s$ as shown in the above Equation 14.

The codebook $F_{\chi,con}$ may be configured by directly concatenating two codebooks $\tilde{F}_w$ and $\tilde{F}_d$. For example, the codebook $F_{\chi,con}$ may be expressed by $F_{\chi,con} = \{\tilde{F}_w, \tilde{F}_d\}$. However, concatenating two codebooks may not provide for maximizing the lower bound of distances between the codewords included in $F_{\chi,con} = \{\tilde{F}_w, \tilde{F}_d\}$. Accordingly, the codebook $F_{\chi,con}$ may be determined by processing at least one of $\tilde{F}_w$ and $\tilde{F}_d$, instead of directly concatenating $\tilde{F}_w$ and $\tilde{F}_d$. In particular, the codebook $F_{\chi,con}$ may be determined by processing at least one of $\tilde{F}_w$ and $\tilde{F}_d$ using a block diagonal matrix U. For example, the codebook $F_{\chi,con}$ may be determined based on $U\tilde{F}_d = \{U\tilde{F}_{du}, U\tilde{F}_{dl}\}$ and $\tilde{F}_w$. In this example, the codebook $F_{\chi,con}$ may be expressed by $F_{\chi,con} = \{\tilde{F}_w, U\tilde{F}_d\}$. The block diagonal matrix U may be an $M_t \times M_t$ matrix, and be expressed by the following Equation 22:

$$U = \begin{bmatrix} U_{11} & 0_{\frac{M_t}{2} \times \frac{M_t}{2}} \\ 0_{\frac{M_t}{2} \times \frac{M_t}{2}} & U_{22} \end{bmatrix}. \quad (22)$$

In Equation 22, $U_{11}$ and $U_{22}$ may be $M_t/2 \times M_t/2$ matrices.

U may be used to maximize the lower bound of distances between the codewords included in the codebook $F_{\chi,con}$, and may be selected using the following Equation 23:

$$U = \underset{U \in U_b(M_t, M_t)}{\operatorname{argmax}} \min_{1 \le i \le j \le N} \sqrt{1 - |f_{\chi,con,i}^* f_{\chi,con,j}|^2}. \quad (23)$$

In Equation 23, $U_b(Mt, Mt)$ denotes a set of $M_t \times M_t$ block diagonal unitary matrices.

The optimal combination of $N_w$ and $N_d$ may be determined according to $\chi$, using the above Equation 18 and Equation 19. Accordingly, the new codebook $F_{\chi,con} = \{\tilde{F}_w, U\tilde{F}_d\}$ corresponding to the optimal combination of $N_w$ and $N_d$ may be determined.

Further, a simple codebook switching scheme may be provided. For example, if $\chi=1$, the codebook $F_{\chi,con}$ may be selected as the first codebook $F_W$. If $\chi=0$, the codebook $F_{\chi,con}$ may be selected as the second codebook $F_d$. In this example, $F_w = \{f_{w,1}, f_{w,2}, \ldots, f_{w,N}\}$ may be determined to maximize the lower bound of distances between the codewords according to the Grassmannian line packing scheme. For example, according to the Grassmannian line packing scheme of $F_w = \{f_{w,1}, f_{w,2}, \ldots, f_{w,N}\}$, the minimum distance between the codewords may be expressed by the following Equation 24:

$$\sigma(F_w) = \min_{1 \le i \le j \le N} \sqrt{1 - |f_{w,i}^* f_{w,j}|^2}. \quad (24)$$

Further, the second codebook $F_d$ may be determined according to $F_s$, and $F_s = \{f_{s,1}, \ldots f_{s,N/2}\}$ may also be determined to maximized the lower bound of distances between the codewords according to the Grassmannian line packing scheme. The minimum distance between the codewords included in $F_s = \{f_{s,1}, \ldots f_{s,N/2}\}$ may be expressed by the following Equation 25:

$$\sigma(F_s) = \min_{1 \le i \le j \le N/S} \sqrt{1 - |f_{s,i}^* f_{s,j}|^2}. \quad (25)$$

Either the first codebook $F_W$ or the second codebook $F_d$ may be selected as the new codebook according to a switching criterion shown in the following Equation 26:

$$F_\chi = \begin{cases} F_d & \text{if } \min\{\lfloor \tilde{N}_w \rfloor_2, N\} \le \frac{N}{2} \\ F_w & \text{if } N - \min\{\lfloor \tilde{N}_w \rfloor_2, N\} > \frac{N}{2}. \end{cases} \quad (26)$$

Figure 3:
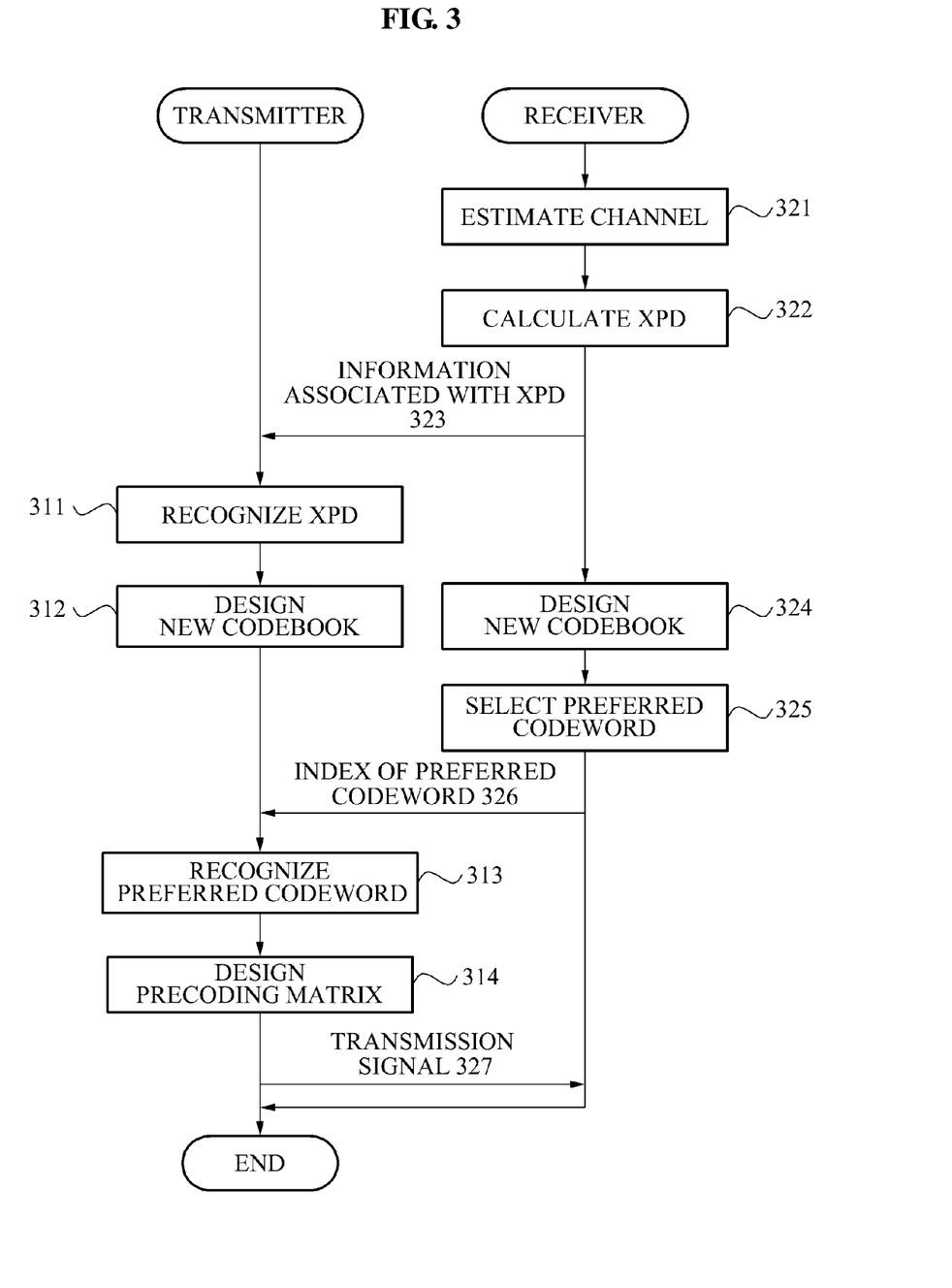
FIG. 3 is a flowchart illustrating an example of a communication method of a transmitter and a receiver.

FIG. 3 illustrates a flowchart of an example of a communication method of a transmitter and a receiver.

Referring to FIG. 3, in operation 321, the receiver estimates a channel between the receiver and the transmitter based on a signal such as a pilot signal transmitted from the transmitter.

Examples of the receiver and transmitter may be a terminal in a downlink and a base station in the downlink, respectively.

In operation 322, the receiver calculates an XPD with respect to the estimated channel. The receiver may calculate $\chi$ after modeling the dual polarized channel $H_\chi$ to $H_\chi = X \odot H_w$ as shown in the above Equation 1. Here, $\chi$ denotes an inverse number of the XPD.

In operation 323, the receiver transfers, to the transmitter, information associated with the XPD. Information associated with the XPD may include a quantized XPD or $\chi$.

In operation 311, the transmitter detects the XPD or $\chi$ based on information associated with the XPD. In operations 312 and 324, the receiver and the transmitter determine a new codebook corresponding to the XPD or $\chi$. Various types of schemes may be applied for the receiver and the transmitter to determine the new codebook.

As an example, the receiver and the transmitter may determine a new codebook $F_{\chi,con}$ that includes N codewords according to the above Equation 10. The receiver and the transmitter may calculate an upper bound of a metric function $G(F_x)$ according to $\chi$, a first codebook $F_W$, and a second codebook $F_d$ according to the above Equation 11, and determine the new codebook $F_{\chi,con}$ with respect to the upper bound of the metric function $G(F_x)$. The receiver and the transmitter may also calculate the upper bound of the metric function $G(F_x)$ according to the above Equation 12, and determine the new codebook $F_{\chi,con}$ with respect to the calculated upper bound of the metric function $G(F_x)$. The receiver and the transmitter may determine an optimal combination of $N_s$ and $N_d$ according $F_{\chi,con}$ to the above Equation 15 through Equation 19, and determine the new codebook with respect to the determined optimal combination. If the new codebook $F_{\chi,con}$ is determined based on the two codebooks $\tilde{F}_w$ and $\tilde{F}_d$, the new codebook $F_{\chi,con}$ may be expressed by $F_{\chi,con}=\{\tilde{F}_w, \tilde{F}_d\}$ or $F_{\chi,con}=\{\tilde{F}_w, U\tilde{F}_d\}$.

If the same new codebook $F_{\chi,con}$ determined by the receiver and the transmitter, the receiver selects, as a preferred codeword, any one of codewords included in the new codebook $F_{\chi,con}$, with respect to the estimated channel in operation 325. In operation 326, the receiver transmits an index of the preferred codeword to the transmitter.

In operation 313, the transmitter detects the preferred codeword according to the index of the preferred codeword. In operation 314, the transmitter generates a precoding matrix based on the preferred codeword. In operation 327, the transmitter generates a transmission signal by precoding at least one data stream using the precoding matrix.

Figure 4:
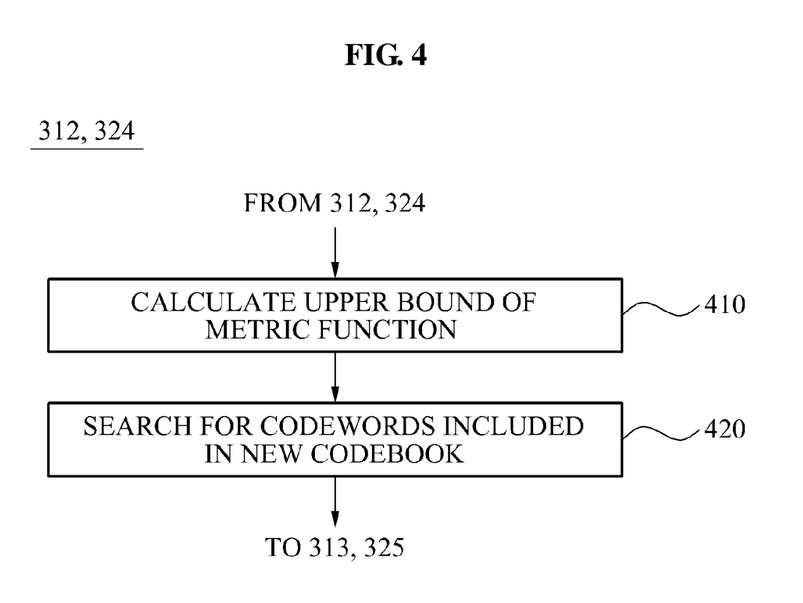
FIG. 4 is a flowchart illustrating an example of a process of determining a new codebook of FIG. 3.

FIG. 4 illustrates a flowchart of an example of a detailed process of operations 312 and 324 of FIG. 3.

In operation 410, the receiver and the transmitter calculate the upper bound of the metric function $G(F_x)$ shown in the above Equation 10. The receiver and the transmitter may use at least one of the above Equation 11, Equation 12, and Equation 15 to calculate the upper bound of the metric function $G(F_x)$.

In operation 420, the receiver and the transmitter search for codewords included in a new codebook based on the upper bound of the metric function $G(F_x)$. For example, the receiver and the transmitter may determine the new codebook so that the upper bound of the metric function $G(F_x)$ shown in at least one of the above Equation 11, Equation 12, and Equation 15 may be minimized.

Figure 5:
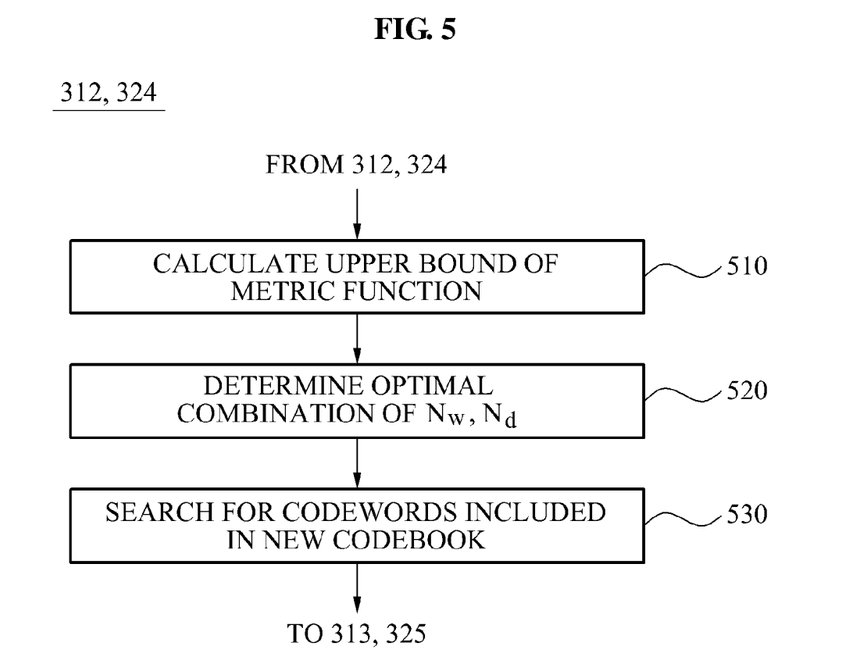
FIG. 5 is a flowchart illustrating another example of a process of determining a new codebook of FIG. 3.

FIG. 5 illustrates a flowchart of another example of a detailed process of operations 312 and 314 of FIG. 3.

In operation 510, the receiver and the transmitter calculate the upper bound of the metric function $G(F_x)$ shown in the above Equation 10. The receiver and the transmitter may apply the above Equation 15 to calculate the upper bound of the metric function $G(F_x)$.

In operation 520, the receiver and the transmitter determine the optimal combination of $N_w$ and $N_d$ so that the upper bound of the metric function $G(F_x)$ may be minimized according to the above Equation 16 through Equation 19.

In operation 530, the receiver and the transmitter search for codewords included in the new codebook using the first codebook $F_W$ and the second codebook $F_d$ according to the optimal combination of $N_w$ and $N_d$.

Since $\tilde{F}_w$ and $\tilde{F}_d$ are determined according to the optimal combination of $N_w$ and $N_d$, the transmitter and the receiver may determine the new codebook with respect to $\tilde{F}_w$ and $\tilde{F}_d$. For example, the new codebook $F_{\chi,con}$ may be determined as $F_{\chi,con}=\{\tilde{F}_w, \tilde{F}_d\}$ or $F_{\chi,con}=\{\tilde{F}_w, U\tilde{F}_d\}$.

Figure 6:
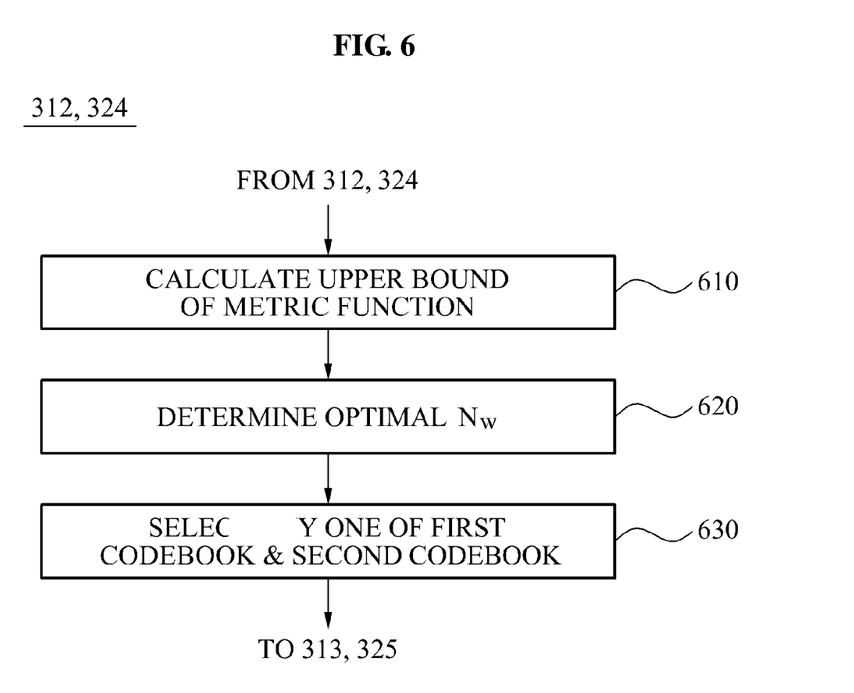
FIG. 6 is a flowchart illustrating still another example of a process of determining a new codebook of FIG. 3.

FIG. 6 illustrates a flowchart of still another example of a process of operations 312 and 324.

In operation 610, the receiver and the transmitter calculate the upper bound of the metric function $G(F_x)$ shown in the above Equation 10. The receiver and the transmitter may apply the above Equation 15 to calculate the upper bound of the metric function $G(F_x)$.

In operation 620, the receiver and the transmitter determine an optimal $N_w$, so that the upper bound of the metric function $G(F_x)$ may be minimized according to the above Equation 16 through Equation 19.

In operation 630, the receiver and the transmitter select, as the new codebook, either the first codebook $F_W$ or the second codebook $F_d$, according to the optimal $N_w$, as shown in the above Equation 26. The receiver and the transmitter may determine $N_w$ and then select, as the new codebook, either the first codebook $F_W$ or the second codebook $F_d$, according to the determined $N_w$.

Figure 7:
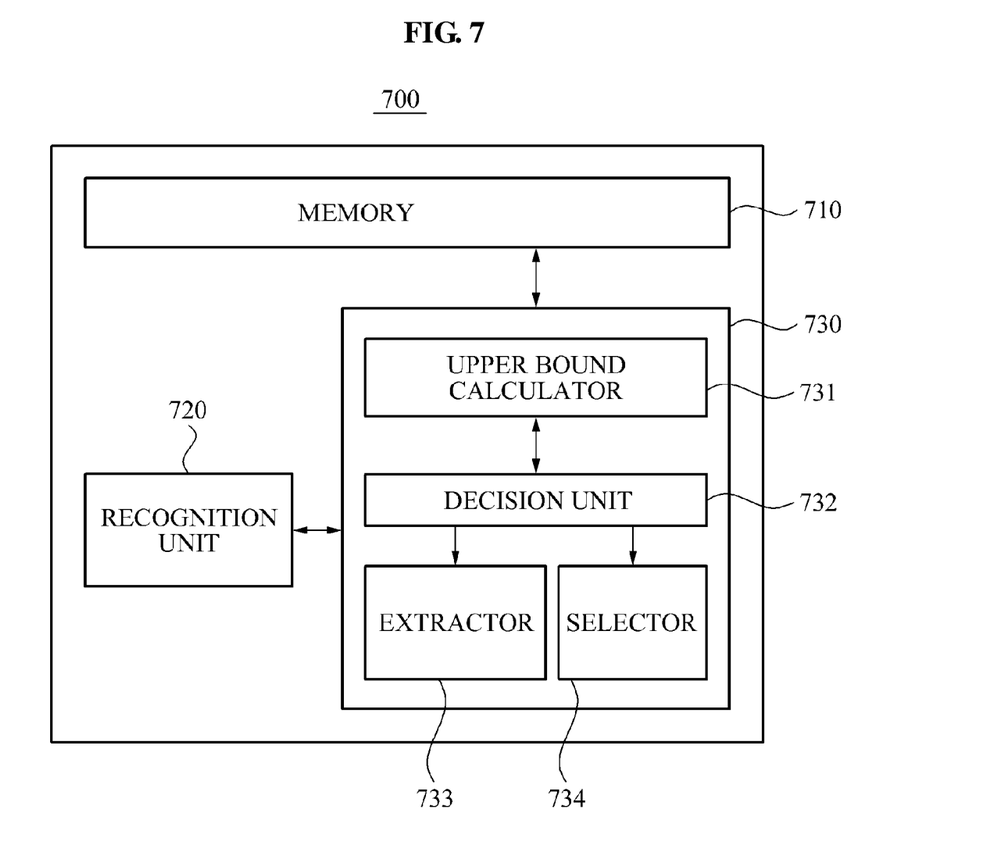
FIG. 7 is a block diagram illustrating an example of a communication apparatus.

FIG. 7 illustrates an example of a communication apparatus 700.

The communication apparatus includes a memory 710, a recognition unit 720, and a configuring unit 730. The configuring unit 730 includes an upper bound calculator 731, a decision unit 732, an extractor 733, and a selector 734. The communication apparatus 700 may be applicable to, for example, a base station, a terminal, and a relay, and the like.

At least one codebook may be stored in the memory 710. In particular, a first codebook and a second codebook may be pre-stored in the memory 710. Further, a configured new codebook may be stored in the memory 710.

The recognition unit 720 may detect an XPD corresponding to a channel formed between a receiver (not shown) and a transmitter (not shown). Detection of the XPD may be equivalent to detection of $\chi$. For example, if the communication apparatus 700 is implemented at the receiver, the recognition unit 720 may detect the XPD from a channel estimated by the receiver. If the communication apparatus 700 is implemented at the transmitter, the recognition unit 720 may detect the XPD based on information associated with the XPD fed back from the receiver.

The configuring unit 730 may calculate a metric function based on the XPD, and configure the new codebook corresponding to the XPD according to the metric function.

The upper bound calculator 731 may calculate the upper bound of the metric function using the XPD, the pre-defined first codebook, and the pre-defined second codebook. At least one of the above Equation 11, Equation 12, and Equation 15 may be used.

The decision unit 732 may determine a value of $N_w$ and a value of $N_d$ based on the upper bound of the metric function.

The extractor 733 may extract $N_w$ codewords from the pre-defined first codebook, and extract $N_d$ codewords from the pre-defined second codebook, based on the XPD. The $N_w$ codewords may constitute $\tilde{F}_w$, and the $N_d$ codewords may constitute $\tilde{F}_d$.

The selector 734 may select, as the new codebook, either the first codebook or the second codebook, according to the value of $N_w$ and the value of $N_d$.

Descriptions made above with reference to FIGS. 1 through 6 may be applicable to the communication apparatus 700 and thus further descriptions will be omitted.

The processes, functions, methods and/or software described above including a communication method for a MIMO communication system may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially generated and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples of embodiments have been described above. Nevertheless, it to will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method for a multiple input multiple output (MIMO) communication system, the method comprising:
    detecting a cross-polarization discrimination value (XPD) of a channel formed between a receiver and a transmitter;
    calculating an upper bound of a predetermined metric function based upon the XPD, a pre-defined first codebook, and a pre-defined second codebook;
    configuring a new codebook according to the upper bound of the predetermined metric function; and
    storing, with a processor, the new codebook in a memory for a communication between the receiver and the transmitter.

2. The method of claim 1, wherein the calculating comprises calculating the upper bound of the predetermined metric function according to a weighted sum of a distortion of the pre-defined first codebook and a distortion of the pre-defined second codebook.

3. The method of claim 1, wherein:
    the pre-defined first codebook corresponds to a first channel, the first channel comprising 1 as an inverse number of the XPD, the pre-defined first codebook being provided according to a Grassmannian line packing scheme, and
    the pre-defined second codebook corresponds to a second channel, the second channel comprising 0 as the inverse number of the XPD, the pre-defined second codebook being provided in a block diagonal form.

4. The method of claim 1, wherein the new codebook is used by the receiver and the transmitter to share channel information associated with the channel.

5. A communication method for a multiple input multiple output (MIMO) communication system, the method comprising:
    detecting a cross-polarization discrimination value (XPD) of a channel formed between a receiver and a transmitter;
    configuring a new codebook corresponding to the XPD according to a predetermined metric function; and
    storing, with a processor, the new codebook in a memory for a communication between the receiver and the transmitter, wherein
    the new codebook is configured according to the predetermined metric function, with respect to distortions of codewords included in the new codebook.

6. The method of claim 5, wherein the new codebook is configured according to an upper bound of the predetermined metric function based upon the XPD.

7. The method of claim 5, wherein:
    the predetermined metric function is associated with a distortion of an average signal-to-noise ratio (SNR); and
    the codewords included in the new codebook quantize a particular space, resulting in a distortion of the average SNR.

8. A non-transitory computer-readable recording medium storing a program having instructions that cause a processor to:
    detect a cross-polarization discrimination value (XPD) of a channel formed between a receiver and a transmitter;
    calculate an upper bound of a predetermined metric function based upon the XPD, a pre-defined first codebook, and a pre-defined second codebook;
    configure a new codebook according to the upper bound of the predetermined metric function; and
    store the new codebook in a memory for a communication between the receiver and the transmitter.

9. A communication method for a multiple input multiple output (MIMO) communication system, the method comprising:
    detecting a cross-polarization discrimination value (XPD) of a channel formed between a receiver and a transmitter;
    extracting, with a processor, $N_w$ first codewords from a pre-defined first codebook, and extracting $N_d$ second codewords from a pre-defined second codebook, based on the XPD; and
    configuring a new codebook based upon the $N_w$ first codewords and the $N_d$ second codewords,
    wherein Nw denotes an integer and $N_d$ denotes an even number.

10. The method of claim 9, further comprising:
    calculating an upper bound of a metric function associated with distortions of codewords included in the new codebook, based upon the XPD; and determining a value of $N_w$ and a value of $N_d$ based upon the upper bound of the metric function.

11. The method of claim 10, wherein the calculating comprises calculating the upper bound of the metric function according to a random vector quantization.

12. The method of claim 10, wherein the calculating comprises calculating the upper bound of the metric function according to a weighted sum of a distortion of the pre-defined first codebook and a distortion of the pre-defined second codebook.

13. The method of claim 10, wherein the determining comprises determining the value of $N_w$ and the value of $N_d$ so that the upper bound of the metric function is substantially minimized.

14. The method of claim 9, wherein the configuring comprises configuring the new codebook according to a minimum distance between codewords included in the new codebook.

15. The method of claim 9, wherein the configuring comprises configuring the new codebook by processing at least one of the $N_w$ first codewords and the $N_d$ second codewords with respect to a block diagonal unitary matrix.

16. A communication method for a multiple input multiple output (MIMO) communication system, the method comprising:
    detecting a cross-polarization discrimination value (XPD) of a channel formed between a receiver and a transmitter;
    calculating, with a processor, an upper bound of a metric function associated with distortions of codewords included in a new codebook, based upon the XPD;
    determining a value of $N_w$ associated with a first codebook and a value of $N_d$ associated with a second codebook, with respect to the upper bound of the metric function; and
    selecting one of the first codebook and the second codebook as the new codebook, according to the value of $N_w$ and the value of $N_d$,
    wherein $N_w$ denotes an integer and $N_d$ denotes an even number.

17. The method of claim 16, wherein the selecting comprises selecting the new codebook according to a comparison of the value of $N_w$ and the value of $N_d$ with a predetermined value.

18. The method of claim 16, wherein:
    the first codebook corresponds to a first channel, the first channel having 1 as an inverse number of the XPD, and the first codebook being provided according to a Grassmannian line packing scheme, and
    the second codebook corresponds to a second channel, the second channel having zero as the inverse number of the XPD, and the second codebook being provided in a block diagonal form.

19. A communication apparatus for a multiple input multiple output (MIMO) communication system, the communication apparatus comprising:
    a recognition unit configured to detect a cross-polarization discrimination value (XPD) of a channel formed between a receiver and a transmitter;
    an upper bound calculator configured to calculate an upper bound of a predetermined metric function based upon the XPD, a pre-defined first codebook, and a pre-defined second codebook;
    a configuring unit configured to configure a new codebook according to the calculated upper bound of the predetermined metric function;
    a memory configured to store the new codebook for a communication between the receiver and the transmitter; and
    a processor configured to store the new codebook in the memory.

20. The communication apparatus of claim 19, wherein the configuring unit comprises an extractor configured to:
    extract $N_w$ first codewords from the pre-defined first codebook; and
    extract $N_d$ second codewords from the pre-defined second codebook, based on the XPD,
    wherein $N_w$ denotes an integer and $N_d$ denotes an even number.

21. The communication apparatus of claim 20, wherein the configuring unit comprises a decision unit configured to determine a value of $N_w$ and a value of $N_d$ based upon the upper bound of the predetermined metric function associated with distortions of codewords included in the new codebook.

22. The communication apparatus of claim 21, wherein the configuring unit comprises a selector configured to select one of the pre-defined first codebook and the pre-defined second codebook as the new codebook, according to the value of $N_w$ and the value of $N_d$.

* * * * *